(12) United States Patent
Arbeus

(10) Patent No.: US 6,305,692 B1
(45) Date of Patent: *Oct. 23, 2001

(54) SEAL DEVICE

(75) Inventor: Ulf Arbeus, Lidingo (SE)

(73) Assignee: ITT Manufacturing Enterprises, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/244,465

(22) Filed: Feb. 4, 1999

(30) Foreign Application Priority Data

Feb. 25, 1998 (SE) .................................. 9800553-1

(51) Int. Cl.⁷ ...................................... F16J 15/34
(52) U.S. Cl. ......................... 277/361; 277/366; 277/408
(58) Field of Search ................. 415/175, 170.1, 415/110, 111; 417/423.1; 277/361, 366, 368, 408, 370, 371

(56) References Cited

U.S. PATENT DOCUMENTS

| | | |
|---|---|---|
| 2,824,759 | 2/1958 | Tracy . |
| 3,489,419 * | 1/1970 | Stratienko .................. 277/366 HY |
| 3,884,482 | 5/1975 | Ball et al. . |
| 3,888,495 | 6/1975 | Mayer . |
| 5,520,506 * | 5/1996 | Luthi ................................. 415/58.4 |
| 5,545,015 * | 8/1996 | Scherrer ............................. 417/360 |
| 5,553,867 | 9/1996 | Rockwood . |
| 5,727,792 * | 3/1998 | Rockwood ......................... 415/175 |

FOREIGN PATENT DOCUMENTS

| | | |
|---|---|---|
| 38 04 183 A1 | 2/1988 | (DE) . |
| 0 477 153 A1 | 3/1992 | (EP) . |
| 0 939 231 B1 | 8/2000 | (EP) . |
| 2 008 305 | 1/1970 | (FR) . |
| 2 220 723 | 4/1974 | (FR) . |

OTHER PUBLICATIONS

Pressure Keeps Mechanical Seal Safe and Cool; Product Engineering, vol. 44, No. 8, Aug. 1, 1973, p. 17.

Troskolanski et al.; Kreiselpumpen; Berechnunb und Konstruktion; 493 Abbildungen mit 8 Farbtafein; Birkhauser Verlag, Basel Und Stuttgart; pp. 5–8.

Search Report; EP 0 939 231 A1.

* cited by examiner

*Primary Examiner*—Chuck Y. Mah
*Assistant Examiner*—Enoch Peavey
(74) *Attorney, Agent, or Firm*—Menotti J. Lombardi

(57) ABSTRACT

A seal device for a submersible machine, such as a pump or a mixer, the seal device being designed as an easily replaceable unit having two mechanical face seals parted by a room for a barrier liquid in which a pump impeller is located. The impeller circulates the barrier liquid passing the liquid along the seals and through cooling channels in the driving unit of the machine.

3 Claims, 2 Drawing Sheets

SEAL DEVICE

FIELD OF THE INVENTION

The present invention concerns a device for a submersible machine, such as a pump, a turbine or a mixer.

BACKGROUND OF THE INVENTION

A machine of this type normally includes an electrically driven motor and a hydraulic unit with an impeller connected to the motor via a rotary driving shaft. In order to prevent the medium within the hydraulic unit from flowing along the shaft and penetrating the electric motor, thereby causing damage, one or several seals are arranged between the motor and the hydraulic unit. A common type of seal is the so-called mechanical face seal, which comprises one seal ring rotating with the shaft and one stationary seal ring mounted in the surrounding housing. The two rings are pressed together by spring force thus preventing medium from penetrating between them.

If the medium within the hydraulic unit contains pollutants, a special problem occurs. As the pressure within the hydraulic unit is higher, pollutants may penetrate between the seal surfaces and cause damage, meaning that the seal is worsened or fails totally.

In order to solve this problem it is common to arrange two mechanical seals parted by a room filled with a barrier liquid such as oil, which lubricates and cools the surfaces. By this, the seal adjacent the electric motor will always operate with a clean medium and thus, the risks for damages will decrease drastically. If the seal adjacent the hydraulic unit should be damaged, medium from said unit may enter the barrier liquid room, but by controlling said liquid at regular intervals, the seal could be repaired or replaced before any serious damage has accured. An example of such a design is shown in the Swedish patent No 381 318.

If it has been noted that the barrier liquid has been too diluted by the medium in the hydraulic unit, the seal adjacent said unit must be replaced. If the dilution has been considerable, there is also a risk that the other seal has been damaged and therefore, it might be preferable to replace both seals at the same time.

In order to make such a replacement easier to obtain, it has been suggested to build them together into a unit which makes service easier and increases the reliability. Examples of such designs are shown in the Swedish patents 200 144 and 466 925. In order to obtain good circulation of the barrier liquid within the seal unit, it has been suggested to arrange a pump within the latter. Especially in a case where it has been chosen to use a closed cooling system for the electric motor using the barrier liquid as cooling medium, a pump is necessary if a sufficient flow should be obtained. Known designs such as those shown in Swedish patent 327 904 have, however certain disadvantages concerning space demand and efficiency.

This invention concerns a device which in an effective and secure way obtains the necessary circulation even at a low rotational speed and which has a very limited space demand.

SUMMARY OF INVENTION

A seal device in the form of an easily exchangeable unit for a rotary driving shaft between an electric motor and a hydraulic unit, the seal device comprising: two mechanical face seals with an intermediate room for a barrier liquid that also serves as a cooling medium for an associated electric motor; and a pump for circulating the barrier liquid. The pump is of a half axial or axial type, and includes an impeller to be mounted on the driving shaft, vanes, a first group of stationary guide vanes located upstream of the impeller and a second group of stationary guide vanes located downstream of the impeller.

BRIEF DESCRIPTION OF THE DRAWING

The invention is disclosed more closely below with reference to the enclosed drawings.

FIG. 1 shows a cut through a pump unit provided with a seal arrangement according to the invention, while

DETAILED DESCRIPTION OF THE INVENTION

Figure 1:
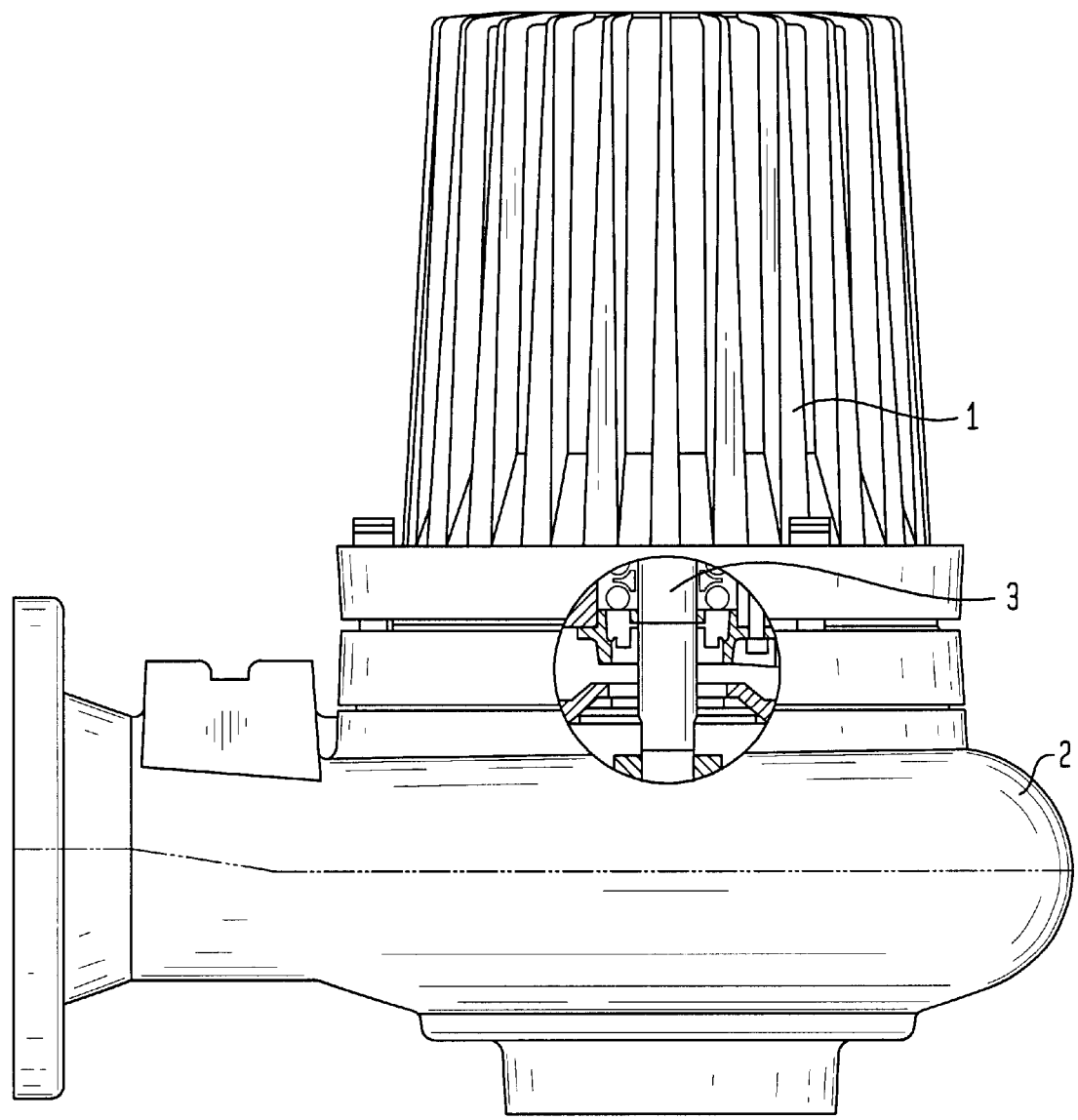
Figure 2:
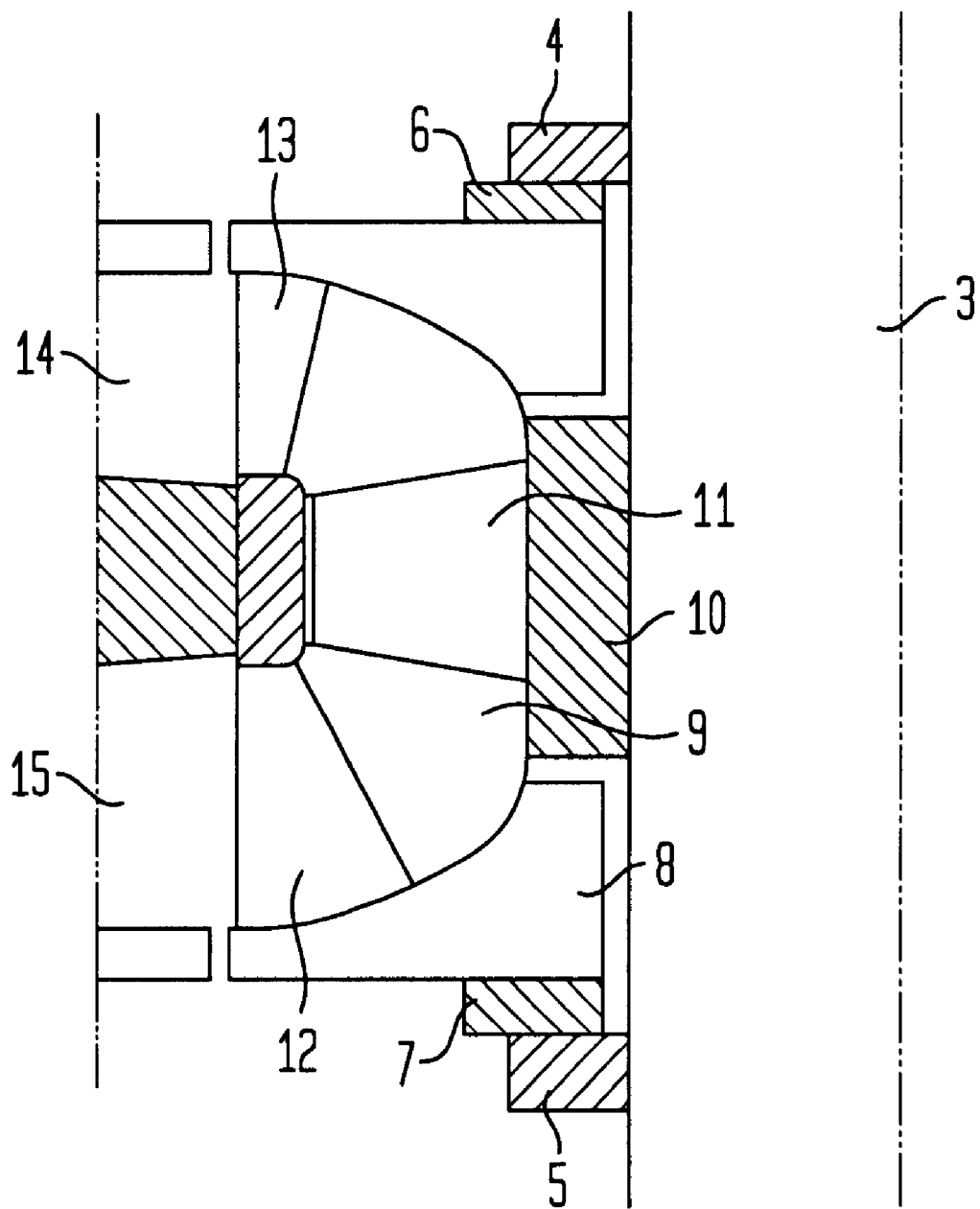
FIG. 2 shows a part of a circulation pump within the seal device.

In the drawings 1 stands for a driving unit, 2 a hydraulic unit and 3 a driving shaft between the two. 4 and 5 stand for rotary seal rings and 6 and 7 stationary seal rings supported in a common holder 8, the latter provided with a cavity 9. 10 stands for an axial pump impeller having vanes 11, 12 and 13 stand for stationary guide vanes and 14 and 15 finally connections for cooling liquid.

The driving shaft 3 between the driving unit 1 and the hydraulic unit 2 is thus sealed by help of a mechanical seal arrangement 4,6 and 5,7. The seal rings 4 and 5 rotate with the shaft 3 and are pressed towards the stationary seal rings 6 and 7 respectively by spring force. In this way liquid within the hydraulic unit is prevented from entering the driving unit along the shaft.

As previously mentioned, the invention concerns a solution where a circulation pump is integrated in a seal arrangement, the pump circulating the barrier liquid in said seal arrangement, and where, according to a special embodiment, the barrier liquid also serves as cooling medium for the driving unit. The cavity or channel 9 within the seal arrangement which contains the impeller of said pump, being connected to cooling channels in the driving unit via ports 14 and 15.

In the designs used up to now, a centrifugal pump impeller with a low specific rotation speed is used where the static head cannot be utilized because of insufficient sealing. The efficiency of such a pump is therefore extremely low, around 5%. The flow obtained will, therefore be almost entirely laminar which results in quite a low heat exchange rate in the cooling channels of the driving unit. The relation between flow losses and actual geometric conditions in a submersible pump means, that the best heat exchange is obtained by a pump having a high specific rotation speed. This is very important in order to secure a turbulent flow which is superior for a good heat exchange.

According to the invention the turbulent flow is obtained even at relatively low rotation speeds as the pump is designed as a half axial or axial type pump in the following way:

The pump inlet is provided with a number of guide vanes 12 which generate a counter rotation which increases the head. The pump impeller 10, which is attached to the driving shaft 3, is a highly loaded half axial or axial type impeller, having a number of vanes which rotate in the channel 9. After a radial linking, the liquid finally passes a number of diffusing guide vanes 13. In this way a design is obtained which is characterized by being very compact. Especially the radial space demand is very limited.

Thanks to the design of the pump with a highly loaded pump impeller, guide vanes and well sealed connections, a very high specific rotation speed is obtained, which creates a turbulent flow of the barrier liquid/cooling medium even at relatively low rotation speeds. A turbulent flow is, as previously mentioned, a condition if a good heat exchange should be obtained if the volume is limited. The latter is necessary as the power needed for the circulation must be very low in order not to reduce the total efficiency of the machine.

The description has referred to a mechanical face seal arrangement, where the integrated pump circulates barrier liquid which also serves as a cooling liquid for the driving motor of the machine. The invention is however not limited to this embodiment, as it is also possible to apply the same when cooling is obtained by help of a liquid other than the barrier liquid.

What is claimed is:

1. A seal device in the form of an easily exchangeable unit for a rotary driving shaft between an electric motor and a hydraulic unit, the seal device comprising:

two mechanical face seals with an intermediate room for a barrier liquid that also serves as a cooling medium for an associated electric motor; and a pump for circulating the barrier liquid, the pump being a half axial or axial type, the pump including:

an impeller of a half axial or axial type having a plurality of vanes, the impeller to be attached on the driving shaft;

a first group of stationary guide vanes located upstream of the impeller; and a second group of stationary guide vanes located downstream of the impeller.

2. A seal device according to claim 1, wherein the face seals include stationary seal rings and the pump further includes a holding device which supports the stationary seal rings, the holding device forming a cavity which contains the impeller.

3. A seal device according to claim 1, wherein the first group of stationary guide vanes located upstream of the impeller are linked so that a counter rotation of the barrier liquid is obtained, thereby increasing the head.

* * * * *